United States Patent [19]

Miyagawa

[11] Patent Number: 4,607,387
[45] Date of Patent: Aug. 19, 1986

[54] PATTERN CHECK DEVICE

[76] Inventor: Michiaki Miyagawa, 702-1, Naganuma, Hachiooji-shi, Tokyo, Japan, 192

[21] Appl. No.: 462,879

[22] Filed: Feb. 1, 1983

[30] Foreign Application Priority Data

Feb. 5, 1982 [JP] Japan .................................. 57-14633

[51] Int. Cl.⁴ ............................................. G06K 9/18
[52] U.S. Cl. .......................................... 382/33; 382/30
[58] Field of Search ...................... 382/18, 24, 30, 33, 382/34, 45

[56] References Cited

U.S. PATENT DOCUMENTS 3,382,482  5/1968  Greenly ................................. 382/33
3,760,356  9/1973  Srivastava ............................ 382/30

*Primary Examiner*—Leo H. Boudreau
*Assistant Examiner*—Michael M. Murray

[57] ABSTRACT

A pattern checking device receives scanning data obtained by raster scanning objects within predefined window regions with a photoelectric converter, converts the scanned data into pixel binary data, and evaluates the binary data in accordance with predetermined criteria to produce an output signal indicative of the evaluation. The evaluation is performed in at least two steps. In the first step, a primary decision circuit compares individual data from each window region in a group to upper and lower thresholds, and outputs primary decision result signals for each window region. In the second step, a secondary decision circuit compares all the primary decision result signals for all the window regions in the group with previously stored decision data for the group, and outputs a pattern check signal indicating whether the pattern appearing in the group of window regions constitutes a good pattern.

6 Claims, 12 Drawing Figures

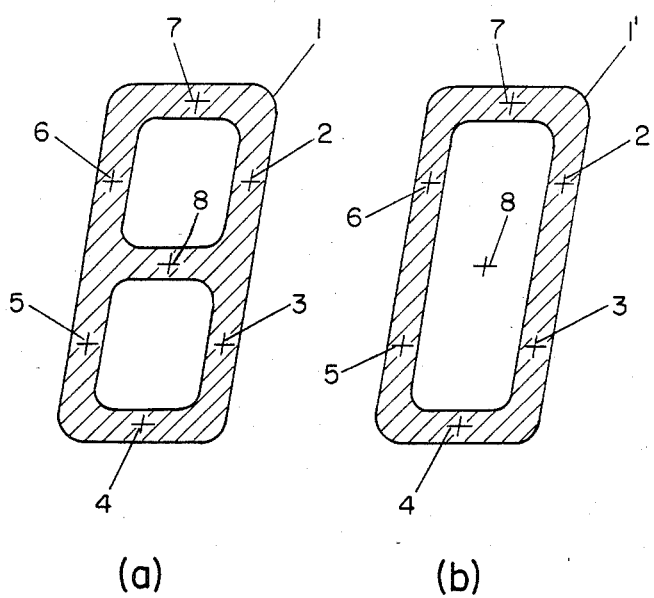
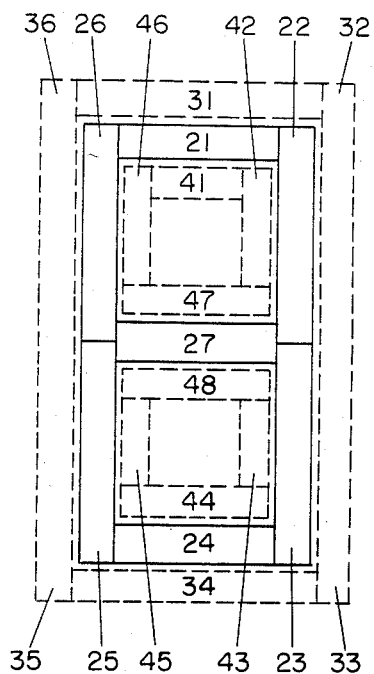
FIG. 1
FIG. 3
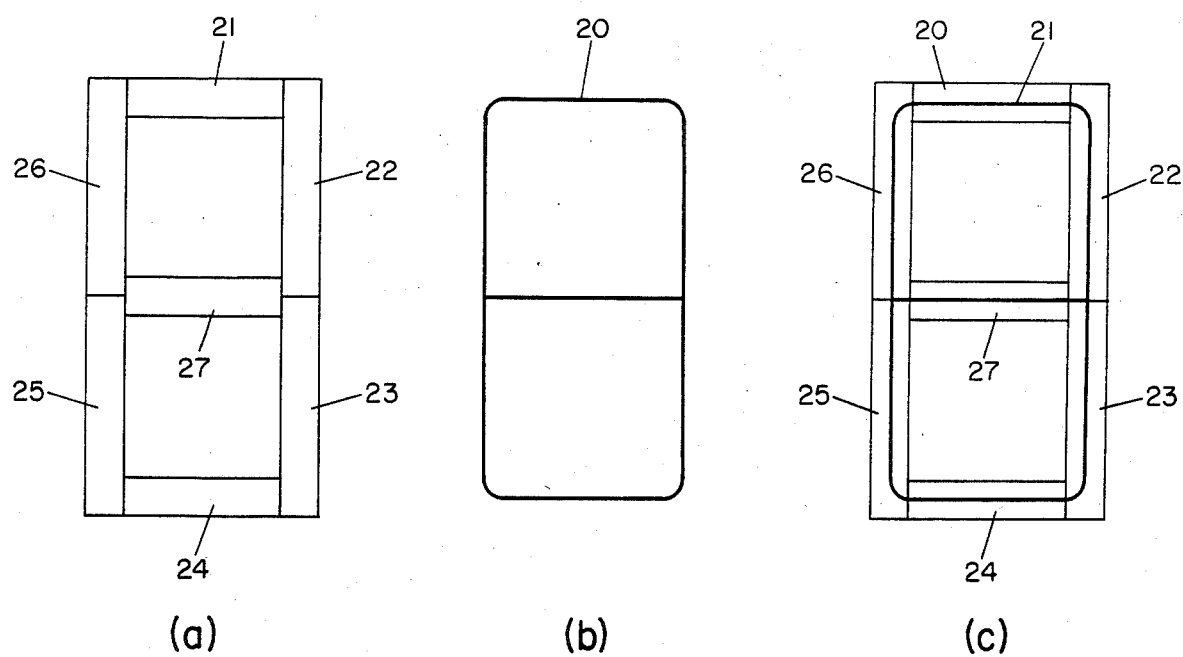
FIG. 2

| WINDOW AREA NUMBER / PATTERN | 21 | 22 | 23 | 24 | 25 | 26 | 27 | 31~36 | 41~48 |
|---|---|---|---|---|---|---|---|---|---|
| DIGIT 8 | 1 | 1 | 1 | 1 | 1 | 1 | 1 | ALL 0 | ALL 0 |
| DIGIT 7 | 1 | 1 | 1 | 0 | 0 | 0 | 0 | ALL 0 | ALL 0 |

| WINDOW AREA NUMBER / PATTERN | 21 | 22 | 23 | 24 | 25 | 26 | 27 | (21+31) | (24+44) | (27+47) | 32~36 | 41~43 | 45~46 |
|---|---|---|---|---|---|---|---|---|---|---|---|---|---|
| DIGIT 8 | 0 | 1 | 1 | 0 | 1 | 1 | 0 | 1 | 1 | 1 | ALL 0 | ALL 0 | ALL 0 |

PATTERN CHECK DEVICE

BACKGROUND OF THE INVENTION

This invention relates to a pattern check device for deciding whether an object pattern being checked is good or bad according to predetermined criteria.

FIG. 1 (a) and (b) illustrate the operation of a conventional pattern check device using a template matching method. In the drawing, the numerals 1 and 1' are object patterns to be checked or tested, and the numerals 2-8 are sampling points respectively indicated with a mark of +.

In FIG. 1 (a) the pattern 1 being checked is a character 8. At this time, the sampling points 2-8 are selected as shown in the drawing by using a template not illustrated to check the existence of a pattern at each point. For example, if a pattern exists, it is a logic 1, and if no pattern, it is a logic 0. Thus, the results of check at each point 2-8 are encoded, and it is recognized which known pattern the pattern checked is classified into by its code.

In FIG. 1 (a), the check results in that a pattern exists (logic 1) at all points of 2-8, which leads to a recognition that the pattern 1 is a character 8. In FIG. 1 (b), only the point 8 has no pattern (logic 0). In this case, an algorithm for deciding whether the pattern is a pattern of a character 0 is previously fixed, and according to the algorithm, it is recognized that it is a character 0.

It is well known that such a pattern check system by template matching has advantages in that only a small quantity of information need be examined due to condensation (the existence of a pattern is detected only at selected sampling points) and the pattern is easily classified by the examined results. Such a pattern check system is effectively used in pattern recognition apparatus such as OCR (Optical Character Reader) where an unknown pattern checked is classified by deciding which standard (known) pattern it corresponds to.

When the template matching method is applied to a pattern check device, some problems are encounted. One is that in checking whether a pattern is good or bad according to whether the pattern exists or not within a window area of an enlarged sampling region, a pattern that is similar but bad is erroneously judged to be good. This is a fatal defect. The reason is as follows. With an alternative decision, i.e. whether a pattern exists or not, if no pattern in the window area, it is judged to be bad. But when a good pattern exists, which is different in size from a good standard pattern, it should not be judged to be bad.

Generally, in the case of a printed pattern, the area of a pattern portion covering a window area varies according to the position checked, and each window area has its characteristic (in this case, large and small sizes of area) at the pattern portion. Therefore, if such a characteristic is not extracted and measured, it is impossible to check the pattern correctly.

SUMMARY OF THE INVENTION

This invention has been proposed in light of the described circumstances of the prior art. It is an object of the present invention to provide a pattern check device which can correctly check a general print pattern, for instance, according to the principle of template matching method, and by developing the method further.

The outline of the present invention is as follows. In the device of the present invention, whether a pattern is good or bad is judged by processing an electric signal of a time series or time based type which is obtained by taking a picture of an object pattern of check by means of two-dimensional sequential scanning-type photoelectric converter (for example, industrial television camera), and a plurality of (generally, a large number of) window areas are set by electrical means within the visual field of the television camera, so as to extract characteristics of the pattern portion seen from each window area in quantity. On the other hand, a threshold range of the upper and lower limits is set on every window area. If the quantity of the extracted characteristics is within the range, it is judged to be a logic 1, and if not, it is judged to be a logic 0 (this is a primary decision). Subsequently, some of window areas are formed into a group. A set of the primary decision results on each included window area is compared and collated with a previously set primary decision table (this is a table of a set of the primary decision results on every group, which are produced on every area by dividing the visual field of a good pattern into window areas in the same manner), thereby to decide whether the pattern is good or bad (this is a secondary decision). This secondary decision is carried on every group, and whether the pattern is good or bad is judged by the results.

If the pattern has been judged to be bad by the above secondary decision, a correlation decision is performed as the next step. The following description deals with the correlation decision.

Even if the pattern checked is good, the quantity of characteristics extracted through predetermined window areas is sometimes not within range of predetermined thresholds, when the pattern gets out of an assigned position in the visual field of a camera, so that the result of the primary decision is bad. But as the patten shifts out of the assigned position only just a little bit, taking correlation between the quantity of characteristics detected through the predetermined window area and the quantity of characteristics detected and through adjacent window area (in this case, the correlation means addition, substraction and so on) will keep the produced correlation quantity within the range of the predetermined thresholds, so that the result of the primary decision is good. According to such a way of thinking, a combination of proper related, e.g. adjacent window areas is determined to perform an arithmetic processing (e.g. addition) of each quantity of characteristics therebetween, and then using the processing result, the primary decision (this is called correlation primary decision) is made. A set of results of the correlation primary decision is compared and collated with a previously set correlation primary decision table (which is previously found in the same manner as the described primary decision table), so as to perform a correlation secondary decision, and the pattern is judged to be good or bad by the result.

It will be apparent that as described above, according to the present invention, whether a pattern checked is good or bad is decided by making a correlation decision in addition to a primary decision and a secondary decision if the result of the secondary decision indicates that the pattern is bad. The shape, size or the like of a window area is determined arbitrarily and properly according to the particular pattern being checked, and is not limited to a rectangle. It is a matter of course that in addition to the area of a pattern portion in the window area, the peripheral length of the pattern portion and the others can be used as the quantity of characteristics extracted through a window area.

BRIEF DESCRIPTION OF THE DRAWINGS

FIG. 1 (a) and (b) illustrate the operation of a conventional pattern check device;

FIG. 2 (a) illustrates one example of window area setting;

FIG. 2 (b) illustrates one form of pattern;

FIG. 2 (c) illustrates a pattern observed through certain window areas;

FIG. 3 illustrates another example of window area setting;

DETAILED DESCRIPTION OF THE PREFERRED EMBODIMENT

Figure 4:
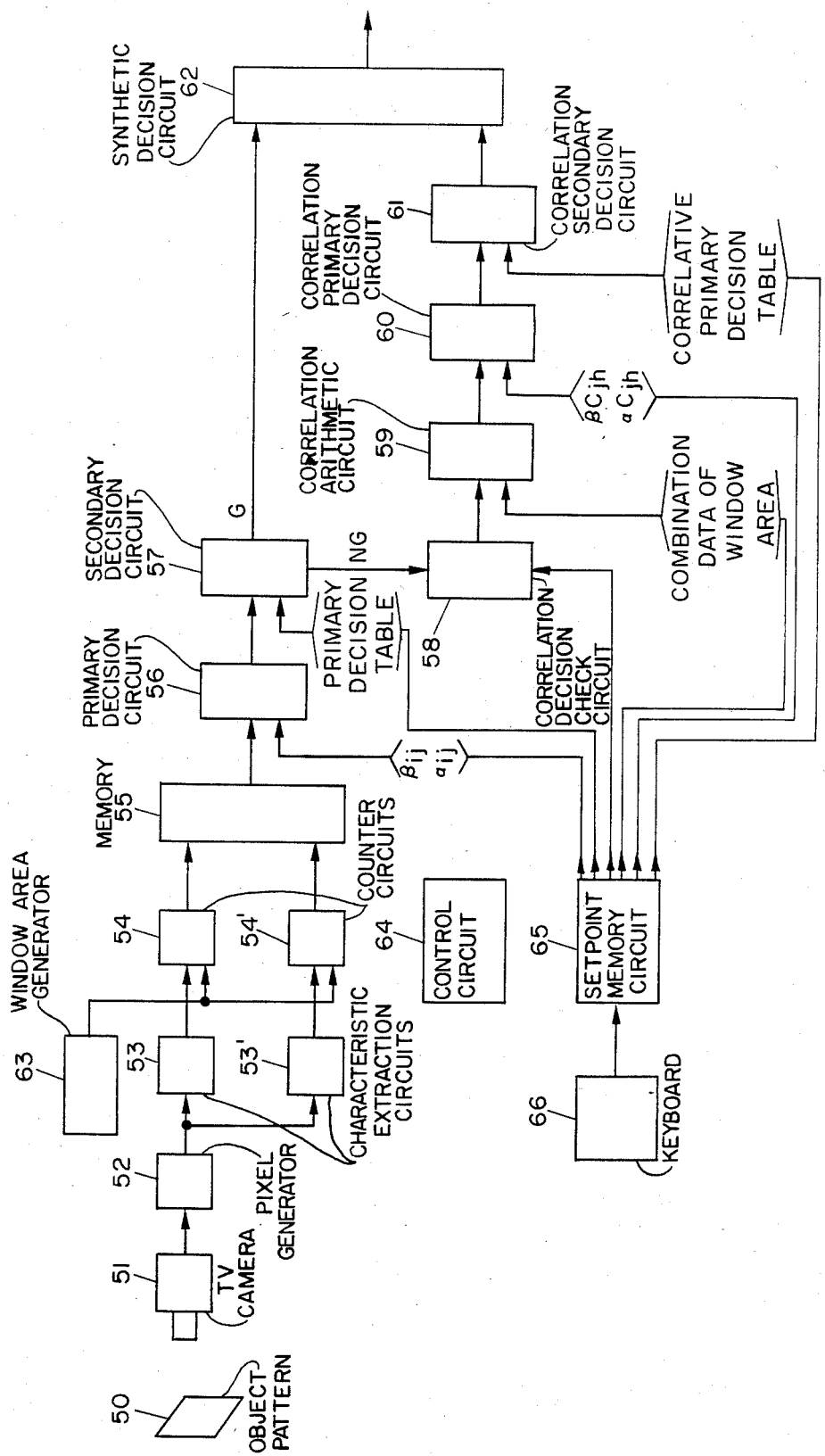
FIG. 4 is a block diagram showing one embodiment of the present invention.

This invention will now be described by way of one embodiment with reference to the drawings.

FIG. 2 (a) illustrates one example of setting window areas, FIG. 2 (b) illustrates one form of a pattern being checked, and FIG. 2 (c) illustrates the pattern observed through the window areas.

In these drawings, the numerals 21-27 are rectangular window areas, the numeral 20 being a pattern for the object of check (a character 8). As shown in FIG. 2 (c), each part of the pattern 20 is observed through a different window area 21-27.

FIG. 3 illustrates another example of setting of window areas. In the drawing, window areas 31-36 at the exterior of the same window areas 21-27 as those shown in FIG. 2 (a), and window areas 41-48 at the interior thereof are respectively set, whereby if a pattern is arranged out of position, it is possible to take correlation between the central window areas 21-27 and the outside or inside window areas.

FIG. 4 is a block diagram showing one embodiment of the present invention. In the drawing, the numeral 50 is a pattern checked, 51 is an industrial television camera (ITV camera), 52 is a binary-coded-picture element split (pixel generator) circuit, 53 and 53' are characteristic extraction circuits, 54 and 54' are counter circuits, 55 is a counted value memory circuit, 56 is a primary decision circuit, 57 is a secondary decision circuit, 58 is a "correlation decision necessary or unnecessary" circuit, 59 is a correlation arithmetic circuit, 60 is a correlation primary decision circuit, 61 is a correlation secondary decision circuit, 62 is a synthetic decision circuit, 63 is a window area generation circuit, 64 is a control circuit, 65 is a setpoint memory circuit, and 66 is a keyboard.

The following description deals with the outline of an opertion. A time based electrical signal produced by taking a picture of the object pattern 50 with the ITV camera 51 is binary encoded in the binary-coded-picture element split circuit 52 to be split into picture elements or pixels (dots). Generally, electric signals for one picture are plit into 320 dots in the horizontal X-axis direction and 240 dots in the vertical Y-axis direction, totalling to about 77,000 dots. The characteristic extraction circuit 53 is adapted to extract the characteristic when it receives a dot signal from the split circuit 52. For example, supposing that the characteristic is just a large or small area, the area is found by observing white dot signals or black dot signals and counting the length of a portion where the white dot signals exist (the number of dots) at time of lateral horizontal scanning by the next counter circuit 54 (that is, the area is found by a set of lengths). The numeral 53' is a circuit for extracting characteristics other than the area. For instance, in case of detecting the length of a boundary between white and black, the circuit is adapted to extract a boundary point, and the length of the boundary is found by counting the number of boundary points by the next counter circuit 54'. Under the control of a window area signal generated from the window area generation circuit 63, the counter circuits 54, 54' are adapted to perform a counting operation. Therefore, the counting result is the quantity of characteristics extracted on every window area, which is arranged by the window area number and the items of characteristics and once stored in the memory circuit 55. The window area generation circuit 63 is adapted to generate and output signals indicating a lot of window areas of arbitrary shapes which are editted on the basis of data input to the setpoint memory circuit 65 from the keyboard 66.

When the ITV camera completes scanning for one field, the measurement and memory of the characteristic data on every window area are brought to a finish, so that on the basis of this characteristic data, the object pattern is determined to be good or bad by the following circuits 56-69.

The characteristic data on every window area read out from the memory circuit 55 is compared with the upper limit setpoint $\alpha_{ij}$ and the lower limit setpoint $\beta_{ij}$ (wherein, i is a kind of characteristic, and j is a number of a window area) which are set on every window area in the primary decision circuit 56, so as to perform a primary decision on whether the data is within the range of the upper and lower limit thresholds or not. The following complete description deals with a decision processing operation on the characteristic item (i).

The primary decision circuit 56 is adapted to perform a primary decision by checking whether the data $D_{ij}$ in the window area j concerning the characteristic item (i) (in case of area, its size) is within the range of the upper limit setpoint $\alpha_{ij}$, and the lower limit setpoint $\beta_{ij}$ or not, which is carried on every window area. The result of the primary decision is expressed in a logic 1 if the data is within the range of the upper and lower limit threshold, and in a logic 0 if the data is outside of the range. The upper and lower limit threshold can be selected according to each window area and each characteristic item, and these threshold data are input from the keyboard 66 to be stored in the setpoint memory circuit 65, so that the primary decision circuit 56 is adapted to read out the data and use same.

Generally, an object pattern to be checked is often composed of N-small patterns (N is an arbitrary integral number). Therefore, each window area is formed into N-groups in such a manner as to correspond to N-small patterns. For example, if an object pattern to be checked is "ABCD", this is thought to be composed of four small patterns (each character forms a small pattern respectively). Every small pattern is not composed of a character unit or a figure unit, but is sometimes composed of a unit of plural characters.

The combination of grouped window area numbers is input by means of the keyboard 66 to be stored in the setpoint memory circuit 65. The secondary decision circuit 57 is adapted to read out combination of grouped window areas from the memory circuit 65, and according to the combination, the primary decision results on each window area produced from the primary decision circuit 56 are divided into groups. Subsequently, the secondary decision circuit 57 compares and collates the grouped primary decision results with the primary decision table read out from the setpoint memory circuit 65, thereby to decide whether the results are good or bad as a group. The primary decision table is previously found on every pattern chacked and is stored in the setpoint memory circuit 65.

Figures 5, 6, 7:
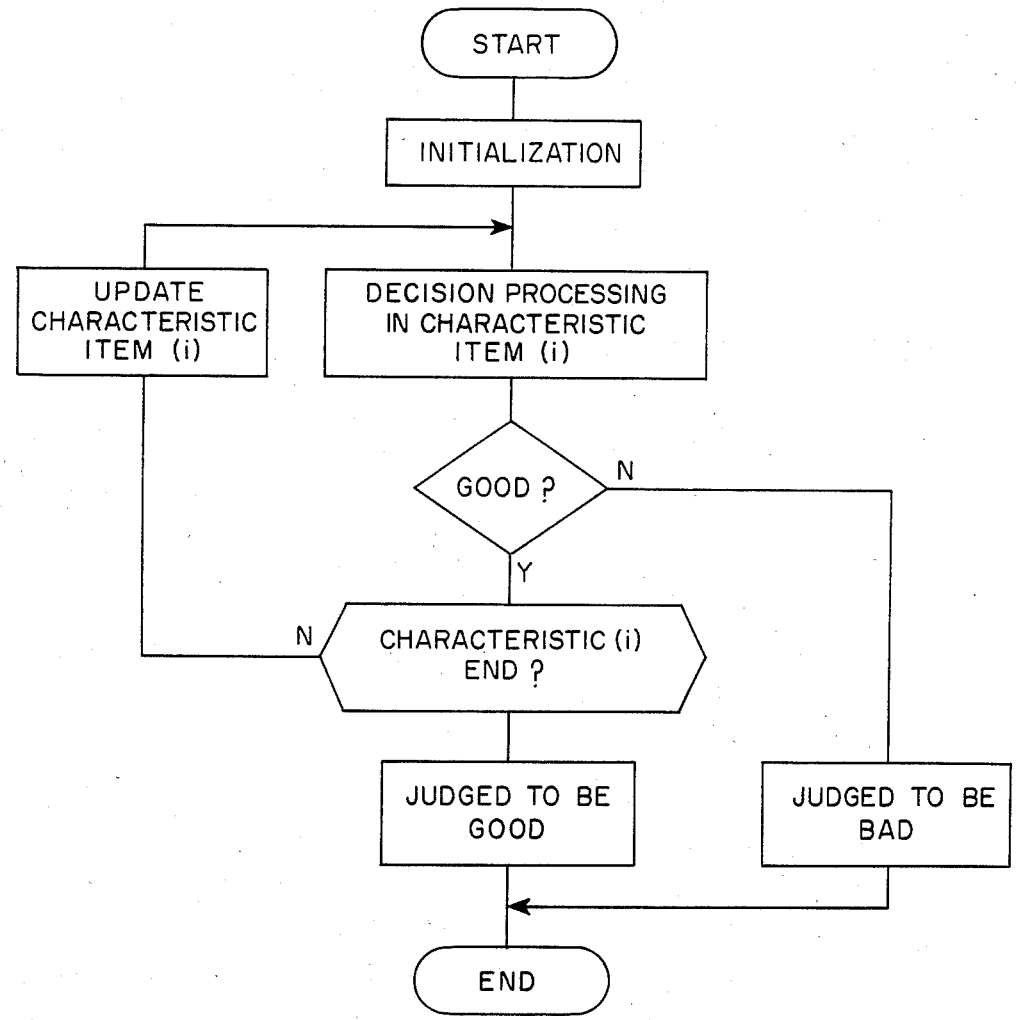
FIG. 5 illustrates a primary decision table.
FIG. 6 illustrates one example of correlation primary decision table.
FIG. 7 is a flow chart showing the outline of operation of the embodiment showm in FIG. 4.
Figure 8:
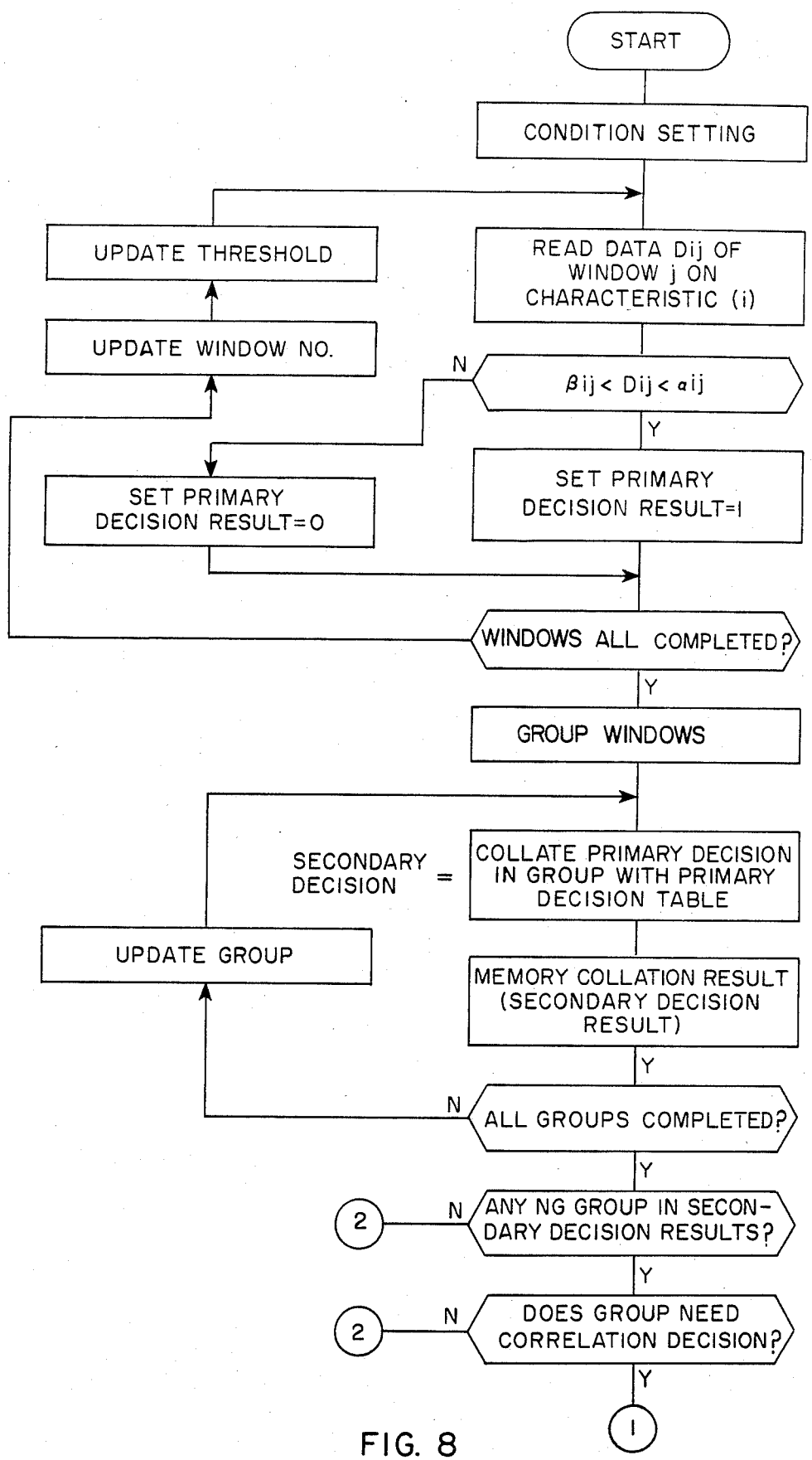
FIG. 8 is a more detailed flow chart of the operation.
Figure 8:
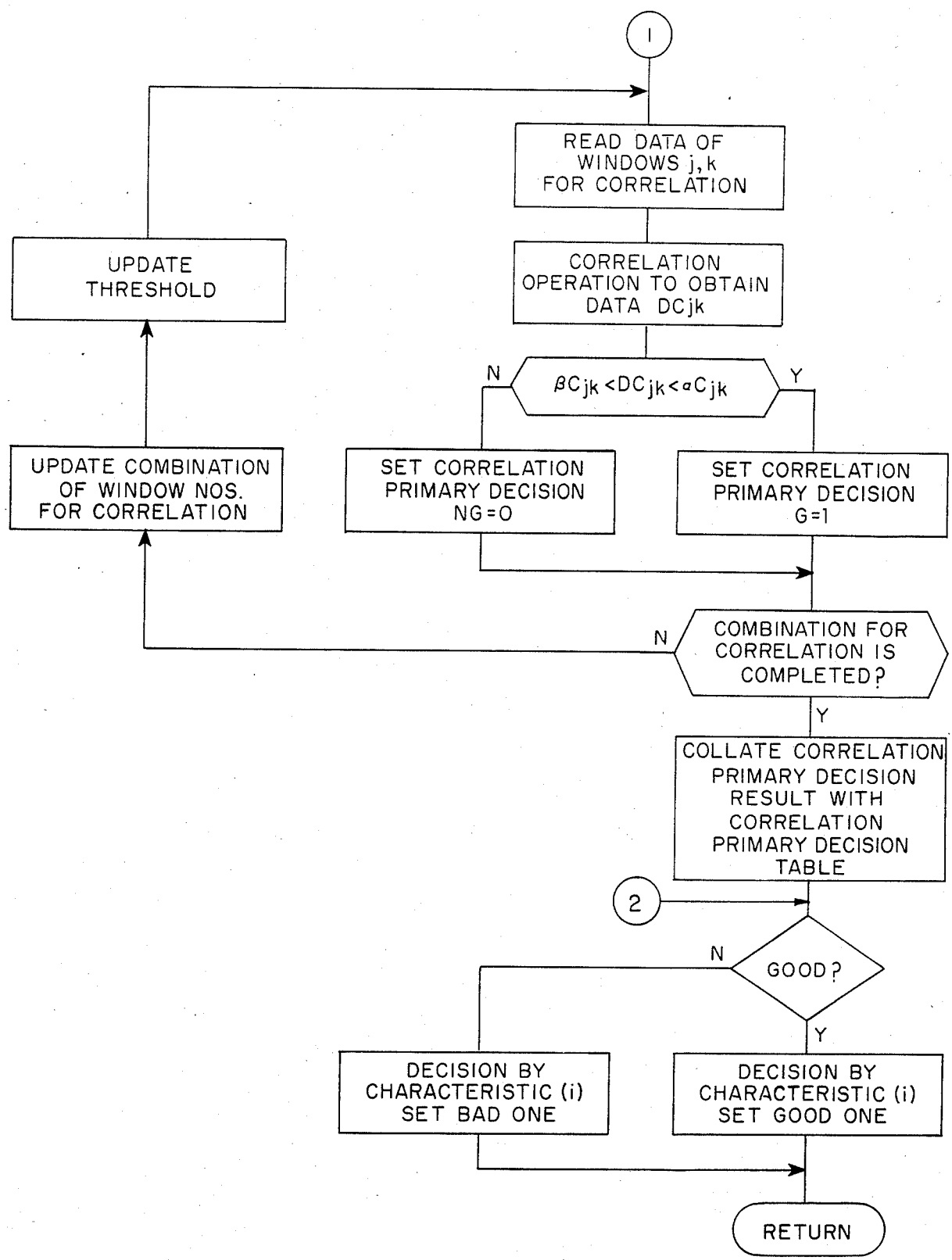

FIG. 5 shows a primary decision table where the FIGS. 8 (FIG. 2 (b)) and 7 are patterns checked respectively by using the window areas set as shown in FIG. 3. It will be understood from FIG. 4 that in case where the FIG. 8 is an object pattern, the primary decision table is encoded data (11111110 . . . 0) arranged in numerical order of the window areas, and if it is the FIG. 7, it is encoded data (1110000 . . . 0).

The secondary decision operation by the secondary decision circuit 57 is carried on every group. If the secondary decision on a group is negative (NG), whether the correlation decision is necessary or not is decided in the correlation decision necessary or unnecessary circuit 58. The correlation decision necessary or unnecessary circuit 58 is adapted to decide that the correlation decision is necessary in some cases and unnecessary in some cases according to previously prescribed conditions of various kinds as determined by the information previously stored in the memory circuit 65. For example, a group of windows may be arranged as shown in FIG. 3 to detect an object or character even when it is not horizontally and vertically centered. The characteristic being detected in each window would be area, i.e., the total number of pixels detected within the window region. The results of each window would be compared with adjacent window regions, i.e., window region 21 would be correlated with the results from windows 31 and 41. In this case the three window regions would be involved in a correlation decision and the set point memory circuit 65 would store information indicating that each of these three windows is involved in a correlation decision. When one of the three windows is being scanned, the correlation decision check circuit would obtain data stored for that window indicating that that window is involved in a correlation decision, and the results of that window scan would be stored for use in the correlation decision process. The correlation decision check circuit 58 therefore may comprise logic gates which receive information from the set point memory circuit 65 indicating whether the window being scanned is involved in a correlation decision. If the information received indicates that a window is involved in a correlation decision, the correlation decision check circuit 58 would respond by passing the characteristic information for that window, e.g., area, to the correlation arithmetic circuit 59. When the correlation decision is needed, the correlation arithmetic circuit 59 is adapted to compute the extracted characteristic data (e.g. to add the pixel data of the window area 21 to the pixel data of the window area 31) concerning the prescribed combination of window areas (the data on this combination is read out from the memory circuit 65), and the result is output as new data $DC_{jk}$. The correlation arithmetic circuit 59 is a logic circuit which receives combination data from set point memory circuit 65 indicating how the respective characteristic data from each of the window regions involved in the correlation decision should be combined, manipulated, or computed. In the case of the embodiment shown in FIG. 3, where the window areas to be combined are areas 21, 31 and 41, and wherein the characteristic data is the number of pixels detected in each of the respective window regions or the area of the object in each of the window regions, the correlation arithmetic circuit 59 may comprise addition circuits to add the area data from each of the three window regions and output new data $DC_{jk}$ which indicates the extent to which the object being sensed fell within the window regions 21, 31 and 41.

The new data $DC_{jk}$ obtained by operation is sent to the correlation primary decision circuit 60, where the correlation primary decision is made on whether the data is within the range of the upper limit setpoint $\alpha C_{jk}$ and the lower limit setpoint $\beta C_{jk}$ or not. If it is within the range, a logic 1 is output, and if it is outside the range, a logic 0 is output. Such correlation primary decision processing is performed on all the assigned combinations of window areas.

In the correlation secondary decision circuit 61, the correlation primary decision results of the circuit 60 are compared and collated with the correlation primary decision table read from the setpoint memory circuit 65 so as to make the correlation secondary decision. If they are coincident, the decision on the characteristic items of the group is affirmative.

FIG. 6 shows one example of correlation primary decision table which is found when the FIG. 8 shifts up out of alignment with the window areas shown in FIG. 2 (c), in this cases, additional areas set as shown in FIG. 3 are used. It will be understood that as the pattern 8 gets out of position a little upward in FIG. 6, the window area 21 will not be properly aligned with the pattern segment, and may not detect a logic 1 when it should but will instead detect a logic 0. However, a logic 1 will be detected from the sum of each characteristic quantity of the window areas 21 and 31 when they are combined. The same holds true with the window areas 24, 27. The correlation primary decision table is previously determined and stored in the setpoint memory circuit 65 by the keyboard 66, which is similar to the described primary decision table.

As described above, the secondary decision processing is performed by the characteristic quantity data directly measured through the window area and the correlation secondary decision processing is performed by correlation arithmetic data obtained by processing the measured data, whereby if the result is affirmative in either of the two decision processings, the synthetic decision circuit 62 will output the result that the decision is affirmative.

FIG. 7 shows the outline of operation of the embodiment illustrated in FIG. 4 and FIG. 8 is a flow chart of details of the operation. In FIG. 8, a window area is simply expressed by "window".

In the above description on the embodiment, the shape of a window area is a rectangle, but an arbitrary shape such as a quandrangle, a pentagon, n-cornered polygon, a round shape, and an annulus instead may be used. Especially, in the case where an object pattern to be checked is not a character but a figure, it is important to select a window area having a shape adapted to the pattern.

Figure 9:
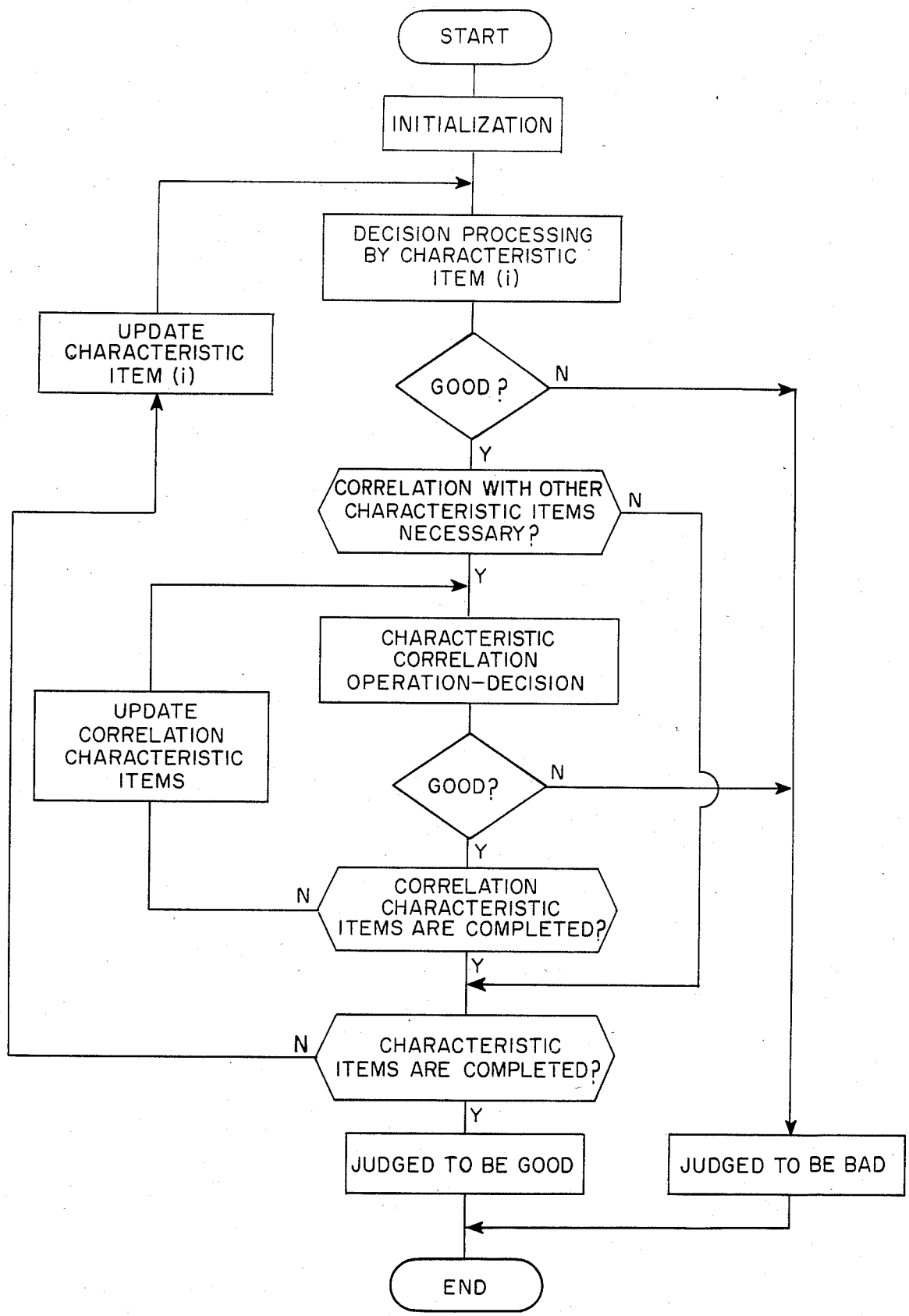
FIG. 9 is a flow chart illustrating operation of the device when correlation is performed on several characteristic items.

In the above embodiment, at the time of correlation decision processing, only the correlation primary decision results are used for the correlation secondary decision, but sometimes the primary decision results are adopted in addition to the correlation primary decision results. The case of addition is described as correlation operation, but in some cases, finding the remainder or the ratio will produce good results if pattern conditions require. In the above embodiment, correlation is taken only on the item (i) of characteristics, but sometimes a correlation between several items of characteristics will produce remarkable results if pattern conditions require. FIG. 9 shows a flow chart of an operation in such a case.

The above description deals with an area and the length of a boundary as items of characteristics, but it is possible to adopt various local face information such as a point of intersection, an endpoint, an arc point, an oblique line and so on.

It will be apparent that the invention, as described above, provides an apparatus where corresponding to an object pattern, conditions of shape, position, number, or the like of a window area, various kinds of thresholds, correlation conditions, various kinds of decision conditions and so on can be freely set in a memory circuit by keyboard input. Accordingly, in conventional pattern check devices, hardware or software, i.e. algorithms remarkably vary with an object pattern, resulting in low mass productivity. But the device of the present invention is highly adapted for a change is a patern as the object of check, which enables mass production.

The advantages of the present invention will be described in the following.

(1) A window area can be set even in the area where there is no pattern as indicated with the numerals 31-48 in FIG. 3, though ordinarily it can be set only the area where a pattern component exists. Therefore, in the case where a pattern checked=good pattern +α, which can not be judged conventionally, the pattern can be easily judged to be bad.

(2) A decision in each window area is made, with the upper and lower limit thresholds set separately on ever item of characteristics and every window area, whereby not only the existence of a pattern in the window area, but also a change in size of the pattern or in shape thereof can be judged quantitatively so as to remarkably increase the accuracy of decision for a slight change in the pattern. Even if the density of the object pattern varies with its part, the accuracy of check can be obtained corresponding to the pattern by controlling the threshold.

(3) Since the window areas are formed into groups which can be respectively decided separately, the chance of mistaking a good pattern for a bad pattern can be lessened even if there is scattering (a very little slippage or change in density) in parts of a good sample.

(4) In addition to the measured data, the data of correlation operation between several window areas is used for the decision on whether a patern is good or bad, whereby the pattern can be checked with high accuracy and stably. Especially in a good sample, the absolute value of the measured value is changed according to a part or transport conditions comparatively frequently. In such a case, a system where the measured values are compared by the upper and lower limit values will cause much mistaking a good pattern for a bad pattern or lower the factor of check of bad pattern. But even under such conditions, the measured values of several window areas have some connections such as "the relative ratio of measured value of several window areas is constant", "the sum of measured values of several window areas is constant", and "a change in a pattern is classified by finding the remainder of measured values of several window areas", whereby the check can be performed with high accuracy by utilizing the above conditions.

(5) In performing correlation secondary decision, not only the result of correlation primary decision is collated with that of a good pattern, as mentioned before, but also the primary decision result of a good pattern under the conditions for performing correlation decision is used to check the pattern, which results in further precise decision. Especially, even if the object pattern gets out of position, the pattern can be checked without mistaking a good pattern for a bad pattern with high accuracy.

(6) In taking correlation, to investigate correlation with other characteristic data can sometimes produce a remarkable effect. For example, taking correlation between an area and the remainder of the peripheral length like contamination check will clarify the difference between good and bad.

(7) The shape of a window area is substantially arbitrary, so that the window area is applicable to various object patterns, and the number of window areas can be reduced so as to make a decision at a high speed.

(8) Local face information is adopted as the item of measured characteristics, so that even a change such as a very little break in a pattern can be extracted with high accuracy.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

I claim:

1. In a pattern checking device which receives scanning data obtained by scanning an object within defined window regions adjustable in size, shape and position with a photoelectric converter of the two-dimensional scanning type, and having means for converting the scanned data into pixel binary data representing characteristics of the object scanned, and having means for evaluating the binary data and for producing an output signal indicative of said evaluation, the improvement wherein the means for evaluating comprises:

primary decision means for comparing the data from each window region from a group of window regions with upper and lower threshold limits, and for outputting a primary decision result signal when said data falls within the range of said upper and lower limits;

secondary decision means for comparing primary decision result signals obtained from the data from the group of window regions with previously stored decision data for said group, and for outputting a pattern check signal indicating whether the pattern appearing in said group of window regions constitutes a good pattern in accordance with said stored decision data; and correlation operation-decision means comprising primary correlation decision means for comparing the data from predefined combinations of window regions with upper and lower threshold limits and for outputting a primary correlation decision result signal when said combined data is within the range of said upper and lower limits, and secondary correlation decision means for comparing the primary correlation decision result signals from predefined window region data and for outputting a correlation pattern check signal indicating whether a pattern appearing in said group of window regions constitutes a good pattern in accordance with previously stored correlation primary decision data.

2. The patten checking device according to claim 1, wherein the window regions form an arrangement corresponding to the numeral 8.

3. The pattern checking device according to claim 1, wherein at least one of the window regions is adjacent to at least one other of the window regions, and wherein the primary correlation decision means combines the data from the two adjacent regions.

4. The pattern checking device according to claim 3 wherein a first set of seven window regions form an arrangement corresponding to the numeral 8, wherein a second set of seven window region are provided also forming an arrangement corresponding to the numeral 8, and wherein each window region in said second set is located adjacent to one of the window regions in the first set.

5. The pattern checking device according to claim 4, wherein a third set of seven window regions are provided also forming an arrangement corresponding to the numeral 8, wherein said second set of window regions are located on the interior of each corresponding window region of the first set, and wherein the third set of window regions are located on the exterior of and adjacent to the first set of window regions.

6. The pattern check device according to claim 5, wherein the primary correlation decisions means combines the data from each adjacent pair of window regions from the first and second set, and combines the data from each adjacent pair of window regions from the first and third set, and produces a primary correlation decision result signal when either of said combined data is within the range of the upper and lower limits.

* * * * *

UNITED STATES PATENT AND TRADEMARK OFFICE
CERTIFICATE OF CORRECTION

PATENT NO. : 4,607,387
DATED : August 19, 1986
INVENTOR(S) : Michiaki Miyagawa

It is certified that error appears in the above-identified patent and that said Letters Patent is hereby corrected as shown below:

First page, following Item [76], insert: --[73] Assignee: Fuji Electric Co., Ltd., Kanagawa, Japan--;
First page, following first line of second column, insert: --Attorney, Agent or Firm - Brumbaugh, Graves, Donohue & Raymond--.

Signed and Sealed this

Seventeenth Day of February, 1987

Attest:

DONALD J. QUIGG

Attesting Officer

Commissioner of Patents and Trademarks